Nov. 12, 1940.   F. J. VOGEL   2,221,619
ELECTRICAL INDUCTION APPARATUS
Filed Dec. 28, 1939
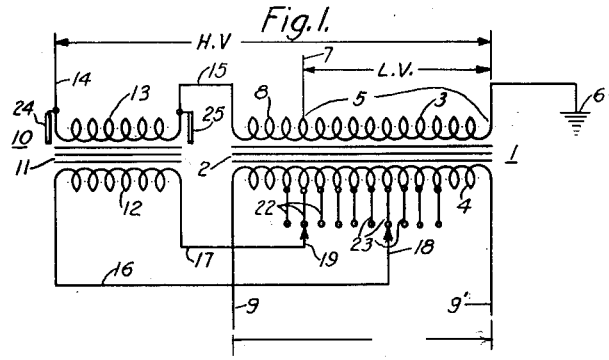
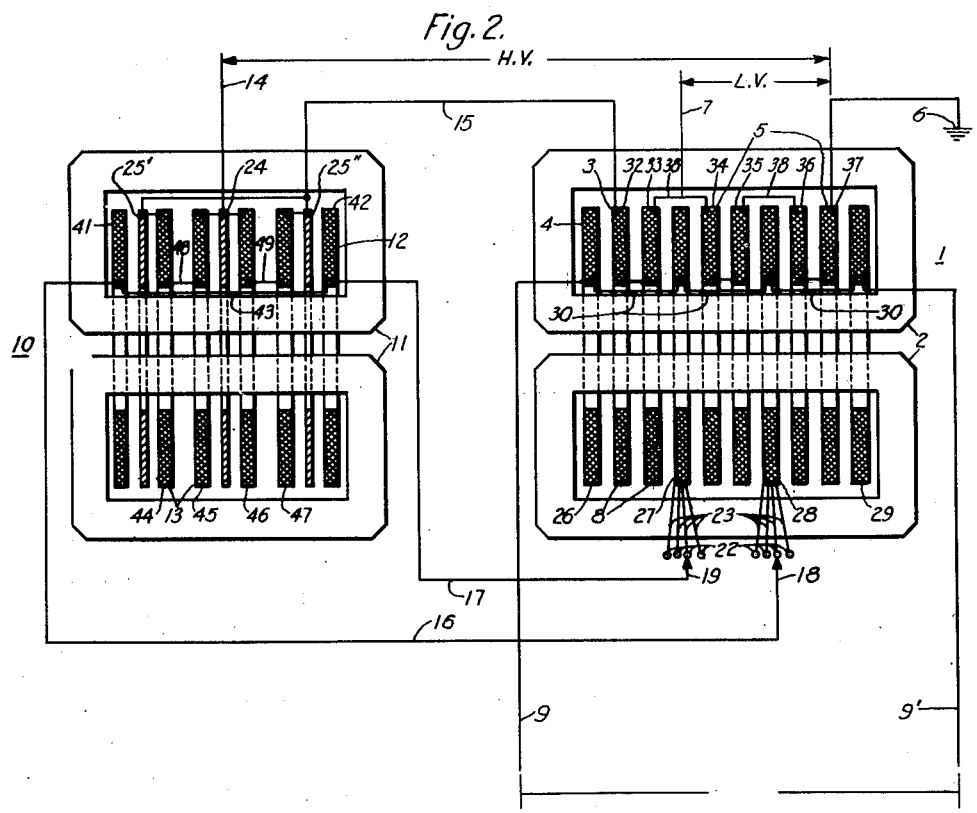
WITNESSES:
INVENTOR
Fred J. Vogel
BY
ATTORNEY Patented Nov. 12, 1940

2,221,619

UNITED STATES PATENT OFFICE 2,221,619

ELECTRICAL INDUCTION APPARATUS

Fred J. Vogel, Sharon, Pa., assignor to Westinghouse Electric & Manufacturing Company, East Pittsburgh, Pa., a corporation of Pennsylvania Application December 28, 1939, Serial No. 311,367

7 Claims. (Cl. 171—119)

My invention relates to electric transformers and particularly to the protection of transformer apparatus against injury resulting from high-voltage surges, such as lightning strokes.

When a regulating transformer unit operating at high voltage is provided with tap-changing mechanism for varying the effective number of turns in one of the transformer windings for the purpose of varying the voltage ratio between the primary and secondary circuits, it is undesirable to provide ratio changing tap connections near the end of the transformer winding that is connected to a power circuit conductor, because of the difficulty of insulating the winding turns that are near the connection of the power circuit conductor to withstand the stresses due to high-voltage surges. Such surges cause a steep voltage gradient along the part of the winding close to the connection thereto of the power circuit conductor over which the lightning surge reaches the winding. One way to avoid the use of tap connections adjacent the high-voltage conductor or "line end" of the winding is to provide a series transformer having its high-voltage winding connected between the main transformer high-voltage winding and the high-voltage power circuit conductor electrically connected thereto, and having its low-voltage winding connected to supply voltage to a tertiary winding of the main transformer, so as to develop a voltage having a desired value and phase relation to buck or boost the output voltage of the main transformer and thereby to supply voltage to the secondary or output circuit from the main transformer that is greater or less than the voltage across the secondary winding of the main transformer would otherwise be.

It has been customary in the past to protect series transformers from lightning surges when connected as above-described by connecting a lightning arrester across the high-voltage winding of the series transformer to discharge in parallel to the transformer winding and thereby limit the voltage across the winding. In order to do this, it is necessary to provide a high-voltage bushing extending through the cover of the transformer tank through which the winding may be connected to the lightning arrester outside of the transformer tank. If lightning arresters are also used, connected across the low-voltage winding of the series transformer, it becomes necessary to also provide bushings through which circuit conductors may lead from the terminals of the low-voltage windings through the transformer tank to which the lightning arrester may be connected outside of the tank.

If the capacity between the terminals of the series transformer is large, the steepness of the voltage gradient thereacross is less than if the capacity is small. If, therefore, the capacity between the terminals of the series transformer is made sufficiently large, it is possible to avoid the use of the lightning arrester across the winding of the series transformer and, therefore, the bushing through which one end of the lightning arrester is connected to the winding. It is also possible to omit the arresters associated with the low-voltage winding of the series transformer since the surge voltage that is normally transmitted from the high-voltage to the low-voltage winding, by electromagnetic conduction, has been eliminated or greatly reduced. It is possible to increase the capacity across the terminals of the high-voltage winding by arranging the high-voltage winding coils in two parallel connected groups. It is also possible to further increase the capacity across the terminals of the high-voltage winding of the series transformer by providing a condenser in the form of two static plates or shields on opposite sides of the coils forming the winding and connected to the winding terminals.

It is an object of my invention to provide a large electrostatic capacity between the terminals of a series transformer having a winding connected in series circuit relation with the winding of a main power transformer to protect the line end of the winding circuit from lightning surges, to prevent oscillations between the series transformer winding and the main transformer winding and to prevent a large voltage drop across the series transformer winding.

Other objects and advantages of the invention will be apparent from the following description of one preferred embodiment thereof, reference being had to the accompanying drawing, in which:

Figure 1 is a simplified diagrammatic view of circuits and apparatus embodying the invention; and Fig. 2 is a diagrammatic view of circuits and apparatus embodying the invention more clearly showing one arrangement of the core and coil structure, including a preferred location for the conducting plates or shields.

Referring particularly to Fig. 1, the transformer apparatus illustrated comprises one unit of a three-phase transformer bank and includes within a common casing (not shown) for the unit, a main transformer 1 and a series transformer 10. The transformer 1 is provided with a core 2 of magnetic material and windings 3 and 4 inductively related thereto. The winding 3 comprises a low voltage winding portion 5, one end of which is grounded at 6 and the other end of which is connected to a low voltage line circuit conductor 7, and a high voltage winding portion 8 extending from the circuit conductor 7 to the other end of the winding that is connected to conductor 15. The winding 4 is a tertiary voltage winding and is connected by conductors 9 and 9'. The several tertiary windings of the three transformer units comprising the three-phase bank may be connected in delta to suppress harmonics and to supply local power requirements. The series transformer 10 is provided with a core structure 11 of magnetic material, a low-voltage winding 12 and a high-voltage winding 13. The high-voltage circuit of the apparatus extends from a high-voltage circuit conductor 14 through winding 13, conductor 15, winding portions 8 and 5, to ground at 6. The low-voltage winding 12 of the series transformer 10 is connected by circuit conductors 16 and 17 to tap-changing switch members 18 and 19, respectively, that are adapted to engage selected ones of contact members 22 that are connected by tap conductors 23 to selected points along the tertiary voltage winding 4 of the main transformer 1. The tap-changing mechanism, including the switch members 18 and 19 and the contact members 22, may be controlled in a well known manner to supply a variable control voltage to the series transformer in a phase relation to either boost or buck the output voltage from the main transformer, so that the voltage of the high-voltage circuit between conductor 13 and ground at 15 is greater than or less than the voltage across the high-voltage winding 3 of the main transformer comprising portions 5 and 8. In Fig. 1, two conducting members 24 and 25 are shown connected to the terminal conductors 14 and 15 respectively, of the winding 13, to provide a large capacity condenser therebetween in the space occupied by the winding 13.

Because of the large electrostatic capacity existing between the members 24 and 25, a voltage surge having a steep wave front entering the apparatus from the conductor 14 is applied to the conductor 15 in a very short time so that practically no potential drop is developed between the conductors 14 and 15 across the winding 13 as a result of the voltage surge.

Referring to Fig. 2, the core structure 2 of the main transformer 1 may consist of two complete magnetic loop structures, through the windows of which the groups of coils comprising the primary and secondary windings extend. The tertiary voltage winding 4 is shown as comprising a plurality of flat disc-type coils 26, 27, 28 and 29 connected in series between conductors 9 and 9' by means of conductors 30. The coils comprising the winding 4 are so spaced as to accommodate two coils of the high-voltage or low-voltage winding portions 8 or 5 between adjacent coils of the tertiary voltage winding. The winding portion 8 comprises the coils 32 and 33 and the winding portion 5 comprises the coils 34, 35, 36 and 37 that are connected by means of conductors 38, in series circuit relation between the conductor 15 and ground at 6. The series transformer 10 comprises a core structure 11 that is similar in general character to the core structure 2 of the main transformer, and through the windows of which disc-type coils 41 and 42 comprising the low-voltage winding extend. Coils 41 and 42 are connected in series circuit relation by conductor 43 between conductors 16 and 17. The coils 41 and 42 are positioned at opposite ends of the windows through the core loops 11 to provide room for the high-voltage winding 13 in the space therebetween. The high-voltage winding 13 consists of the flat coils 44, 45, 46 and 47 which are arranged in two groups, one group consisting of coils 44 and 45 connected in parallel circuit relation to the group consisting of coils 46 and 47. The high-voltage end of the two groups is connected to a conducting member or shield 24 positioned between them, and also to the line conductor 14, and the low-voltage end of the two groups is connected to conductor 15 and to conducting plates 25' and 25". The plate 25' is positioned between the low-voltage coil 41 and the high-voltage coil 44, and the plate 25" is positioned between the low-voltage coil 42 and the high-voltage coil 47. Both plates 25' and 25" are connected to the conductor 15 and correspond in function to the plate 25 shown in Fig. 1. The two parallel circuits between conductors 14 and 15 include a circuit through coil 45, conductor 48 and coil 44, and a second circuit through coil 46, conductor 49 and coil 47.

It will be apparent to those skilled in the art that modifications in the circuits and apparatus shown may be made within the spirit of my invention, and I do not wish to be limited otherwise than by the scope of the appended claims.

I claim as my invention:
1. Electrical apparatus comprising a main transformer having a core, a high-voltage winding and a low-voltage winding thereon, and a series transformer having a core, a high-voltage winding thereon and a low-voltage winding thereon, the low-voltage winding of the series transformer being connected between the high-voltage winding of the main transformer and a high-voltage terminal of the apparatus, means providing a large electrostatic capacity between the terminals of the high-voltage winding of the series transformer comprising conducting plates on the opposite sides thereof connected to the respective terminals.

2. Electrical apparatus comprising a transformer having a core, a high-voltage winding and a low-voltage winding thereon, and a series transformer having a core, a high-voltage winding thereon and a low-voltage winding thereon, the low-voltage winding of the series transformer being connected between the high-voltage winding of the main transformer and a high-voltage terminal of the apparatus, means for providing a large electrostatic capacity between the terminals of the high-voltage winding of the series transformer comprising arranging the winding in two coil groups connected in parallel circuit relation and conducting plates on the opposite sides of the coil groups and connected to the respective terminals.

3. Electrical apparatus comprising a main transformer having a core, a high-voltage winding and a low-voltage winding, and a tertiary winding all inductively related to the core, and a series transformer having a core, a high-voltage winding thereon and a low-voltage winding thereon, the high-voltage winding of the series transformer being connected between the high-voltage winding of the main transformer and a high-voltage terminal of the apparatus, means providing a large electrostatic capacity between the terminals of the high-voltage winding of the series transformer comprising a conducting plate connected to the high-voltage terminal, the winding being arranged in two coil groups on opposite sides of the plate and connected in parallel circuit relation between the high-voltage terminal and the high-voltage winding of the main transformer, and conducting plates on opposite sides of the coil groups connected to the high-voltage winding of the series transformer and the main transformer secondary winding.

4. Electrical induction apparatus comprising a main transformer having a core, a high-voltage winding and a low-voltage winding inductively related to the core, and a series transformer having a core, a high-voltage winding and a low-voltage winding inductively related to the core, the high-voltage circuit of the apparatus extending from a grounded terminal of the main transformer winding through the high-voltage windings of the two transformers in series to a high-voltage terminal, conducting plates positioned on opposite sides of the winding turns of the series transformer high-voltage winding and connected to the opposite terminals thereof.

5. Electrical induction apparatus comprising a main transformer having a core, a high-voltage winding and a low-voltage winding inductively related to the core, and a series transformer having a core, a high-voltage winding and a low-voltage winding inductively related to the core, the high-voltage circuit of the apparatus extending from a grounded terminal of the main transformer winding through the high-voltage windings of the two transformers in series to a high-voltage terminal, the high-voltage winding of the series transformer comprising a plurality of groups of disc-type coils connected in parallel circuit relation to each other between the high-voltage terminal of the apparatus and the main transformer winding, conducting plates positioned on opposite sides of the coil group and connected to the terminals thereof.

6. Electrical induction apparatus comprising a main transformer having a core, a high-voltage winding and a low-voltage winding inductively related to the core, and a series transformer having a core, a high-voltage winding and a low-voltage winding inductively related to the core, the high-voltage circuit of the apparatus extending from a grounded terminal of the main transformer winding through the high-voltage windings of the two transformers in series to a high-voltage terminal, means including tap-changing mechanism for connecting the low-voltage winding of the series transformer across selected portions of a winding on the main transformer for varying the voltage ratio between the primary and secondary circuits of the apparatus, the high-voltage winding of the series transformer comprising a plurality of groups of disc-type coils connected in parallel circuit relation to each other between the high-voltage terminal and the main transformer winding, and conducting plates positioned on opposite sides of the coil group and connected to the terminals thereof.

7. Electrical induction apparatus comprising a main transformer having a core, a high-voltage winding and a low-voltage winding inductively related to the core, and a series transformer having a core, a high-voltage winding and a low-voltage winding inductively related to the core, the high-voltage circuit of the apparatus extending from a grounded terminal of the main transformer winding through the high-voltage windings of the two transformers in series to a high-voltage terminal, means including tap-changing mechanism for connecting the low-voltage winding of the series transformer across selected portions of a winding on the main transformer for varying the voltage ratio between the primary and secondary circuits of the apparatus, and conducting plates positioned on opposite sides of the winding turns of the series transformer high-voltage winding and connected to the opposite terminals thereof.

FRED J. VOGEL.